United States Patent [19]

Behnisch

[11] 4,251,007
[45] Feb. 17, 1981

[54] PRESSURE COOKER HAVING SAFETY MEANS

[75] Inventor: Roland Behnisch, Tübingen, Fed. Rep. of Germany

[73] Assignee: Braun & Kemmler GmbH & Co. KG, Betzingen, Fed. Rep. of Germany

[21] Appl. No.: 106,897

[22] Filed: Dec. 26, 1979

[30] Foreign Application Priority Data

Jan. 17, 1979 [DE] Fed. Rep. of Germany ....... 2901639

[51] Int. Cl.³ ............................................ B65D 45/00
[52] U.S. Cl. .................................... 220/316; 220/203
[58] Field of Search ............... 220/316, 293, 303, 295, 220/203, 231, 367

[56] References Cited

U.S. PATENT DOCUMENTS

| 3,973,694 | 8/1976 | Tess | 220/316 X |
| 4,103,801 | 8/1978 | Walker | 220/203 |
| 4,159,063 | 6/1979 | Weber et al. | 220/316 |
| 4,162,741 | 7/1979 | Walker et al. | 220/316 X |

Primary Examiner—George T. Hall
Attorney, Agent, or Firm—Michael J. Striker

[57] ABSTRACT

A pressure cooker has a cooking container, a cover retainable on the container by a bayonet lock and having a sealing ring, a radially extending handle on the cover, and a combined valve and safety device arranged in the handle and having valve elements, safety elements and one common operating element interdependently adjusting and actuating the valve and safety elements. The valve elements of the device include a pressure limiting valve simultaneously forming a safety valve and one slider arranged to adjust the pressure limiting valve. The safety elements of the device include two further sliders one of which is formed as a ventilating slider and arranged for lifting of the sealing ring of the cover whereas the other of the sliders is formed as a locking slider and arranged for mechanical locking of the cover on the container. The common operating element is formed as an operating shaft provided with an outer rotary handle member, and the device includes at least one control plate engaged with the operating shaft and having at least one control groove, and a control pin connected with one of the sliders and engaging in the control groove.

15 Claims, 26 Drawing Figures

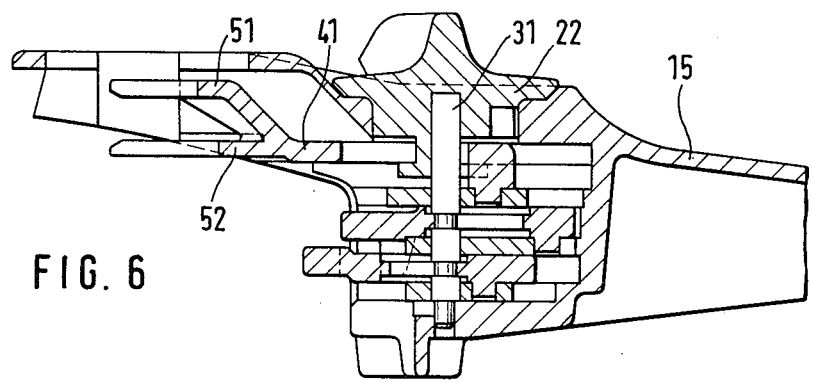
FIG. 6
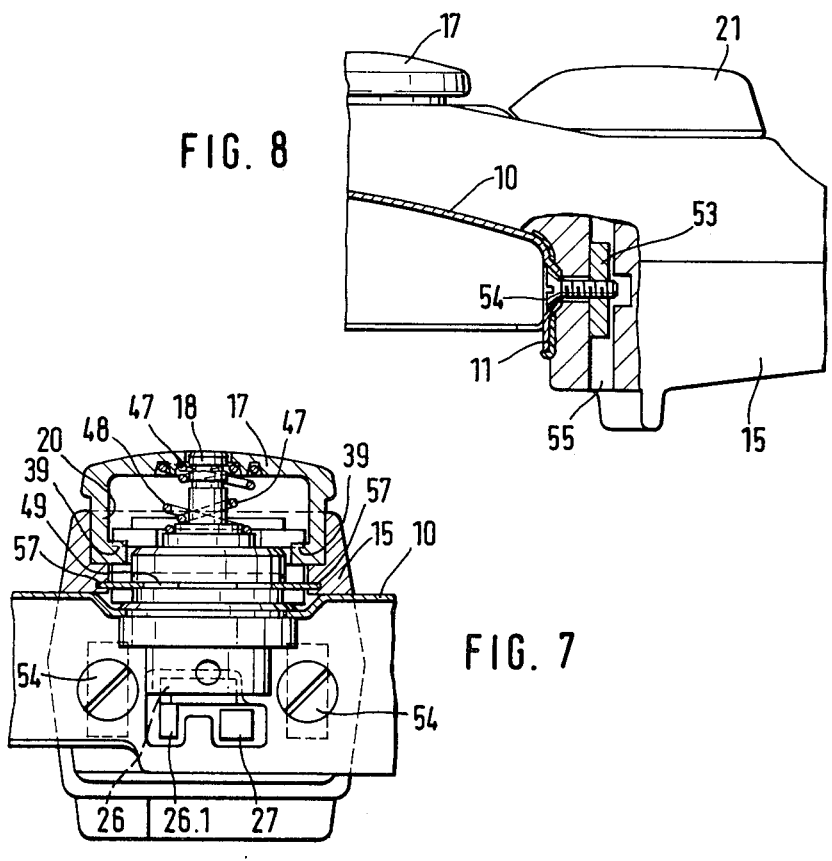
FIG. 8
FIG. 7

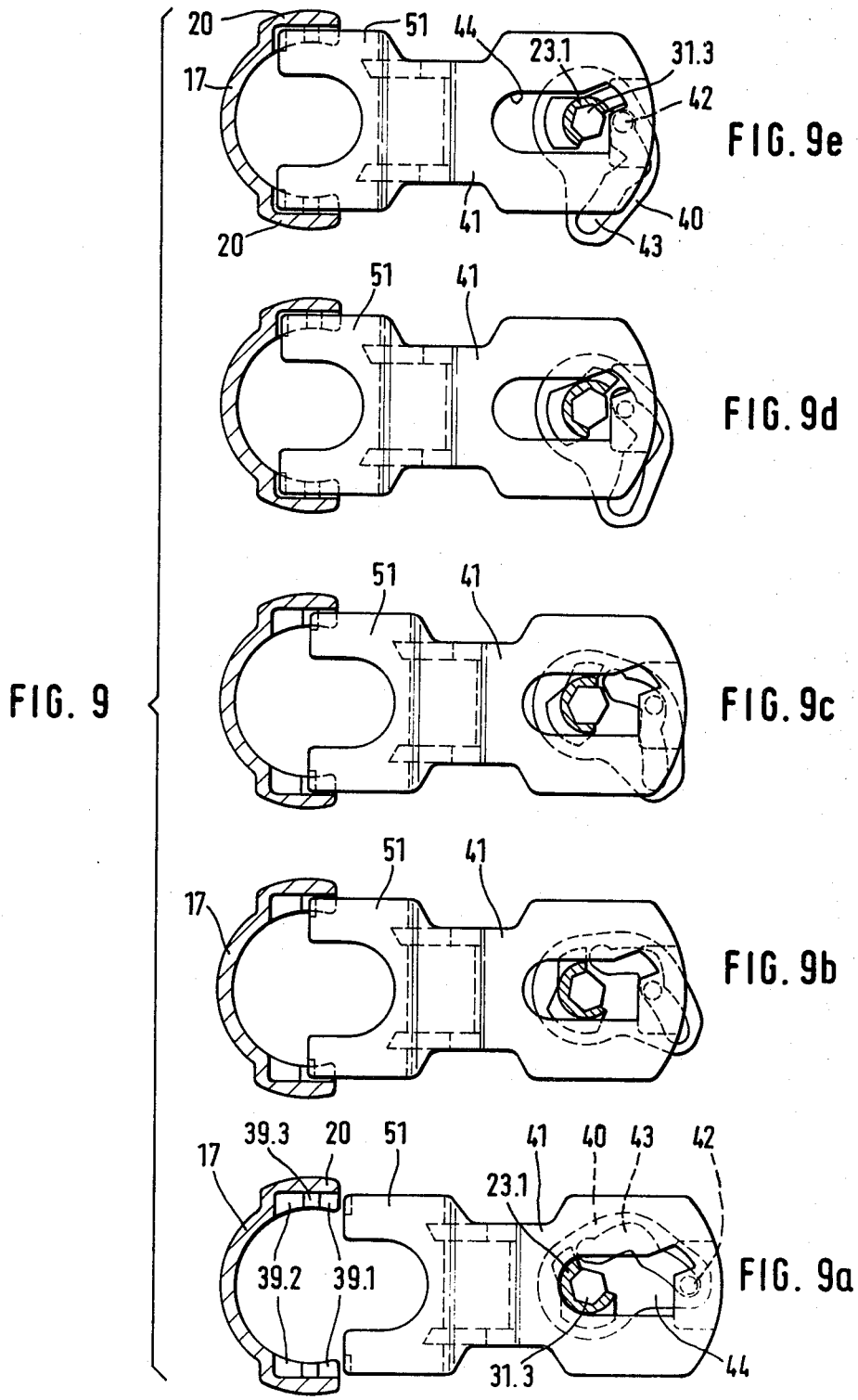

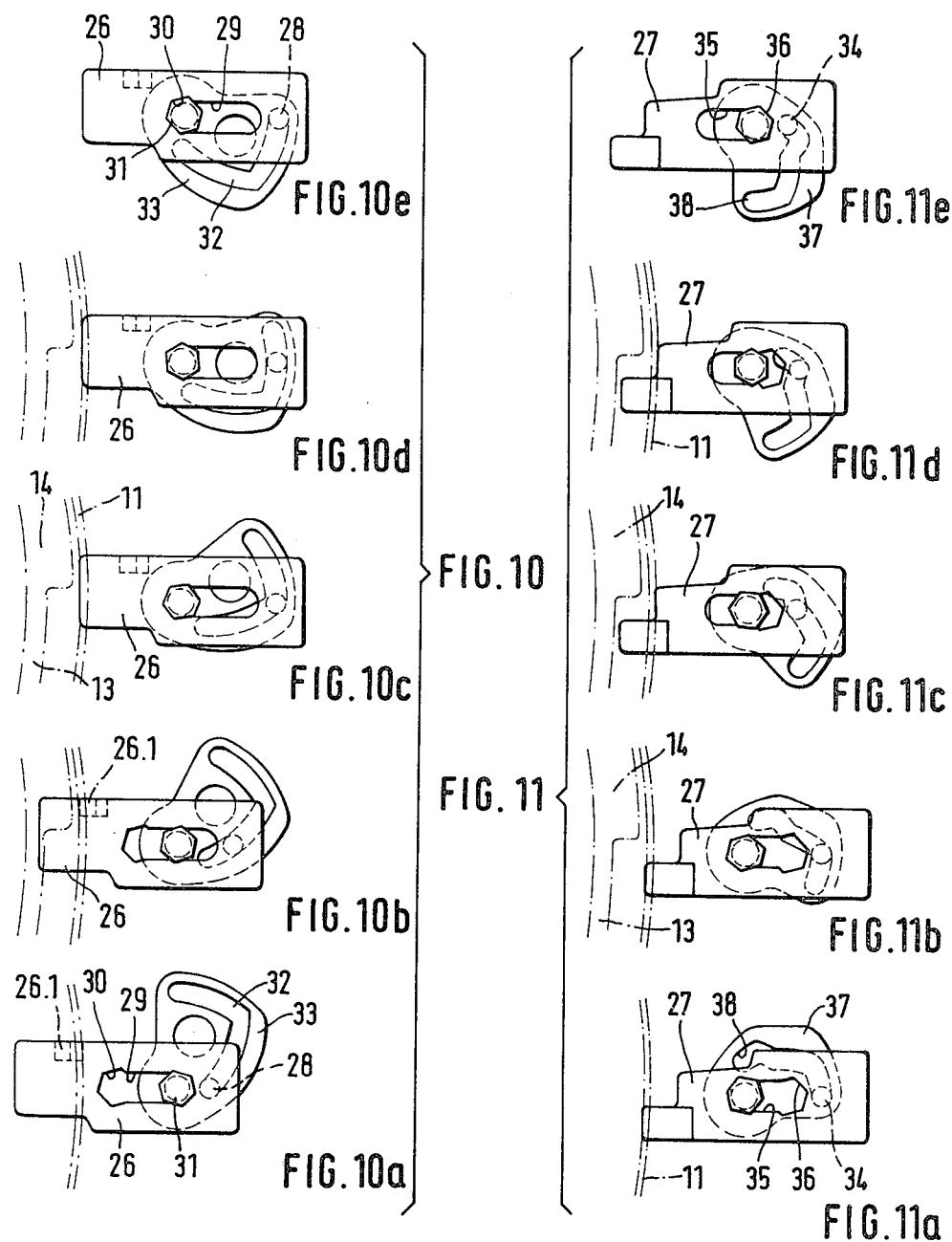

4,251,007

PRESSURE COOKER HAVING SAFETY MEANS

BACKGROUND OF THE INVENTION

The present invention relates to a pressure cooker.

Pressure cookers are known in the art. A known pressure cooker has a cooking container, a cover retainable on the container by a bayonet lock, and a radially extending handle on the cover. A combined valve and safety device is arranged in the handle and provided with one common operating member which adjusts and actuates valve parts and safety parts of the device. The valve parts of the device include a pressure limiting valve which is formed simultaneously as a safety valve and is adjustable by one slider, whereas the sefety parts of the device include two further sliders one of which sliders is formed as a ventilating slider and arranged for lifting sealing rings of the cover, and the other of the sliders is formed as a locking slider and arranged for mechanically locking the cover on the container. Such a pressure cooker is disclosed, for example, in the German Offenlegungsschrift No. 2,609,302. The pressure cooker of the above-described general type possesses the disadvantage in that it involves relatively high manufacturing expenses.

SUMMARY OF THE INVENTION

Accordingly, it is an object of the present invention to provide a pressure cooker which avoids the disadvantages of the prior art.

More particularly, it is an object of the present invention to provide a pressure cooker with a combined valve and safety arrangement which requires lower manufacturing expenses.

In keeping with these objects and with others which will become apparent hereinafter, one feature of the present invention resides, briefly stated, in a pressure cooker in which a common operating member of a valve and safety device is formed as an operating shaft provided with an outer rotary handle member, at least one control plate engages with this operating shaft and has a control groove in which a control pin connected with the slider is engaged. Advantageously, each slider of the device, that is the slider of the valve part and two sliders of the safety part, is provided with one such control plate, and the operating shaft has a plurality of polyhedral axial portions each dimensioned in correspondence with and extending through a respective polyhedral opening of the control plates. It is also possible to provide only one control plate with several conrol grooves each corresponding to a respective one of the control sliders.

The pressure cooker constructed in accordance with the present invention has the advantage in that a relatively expensive cam shaft as a common operating member is eliminated. It suffices to provide instead of the latter one operating shaft which can be manufactured by a simple rotary process from a polyhedral rod. The control plates may be manufactured as simple punched parts or, as the sliders, as injection-molded parts. The guidance of all displaceable parts is provided in corresponding recesses of a handle manufactured from a low heat conductive synthetic plastic material, and the relative regulation of the parts can be attained so that special mounting or safety mechanisms can be eliminated. In the inventive pressure cooker including the common operating member the main advantage remains in that special safety operation of the pressure cooker is attained and the requirement to provide only one ventilating opening in the cover is satisfied. The total combined valve and safety arrangement with the common operating member is arranged in the cover and does not require correspondence between the cooking container and the cover. The pressure cooker in accordance with the present invention makes possible to dispense with a special arresting slider which hinders the fitting of the cover in a certain position of the common operating member on the cooking container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view of a cover in which a combined valve and safety device is built in;

FIG. 6 is a view corresponding to that shown in FIG. 2 but illustrating the position e "Mounting" of the common operating member;

FIG. 7 is a view showing a transverse section of a container cover and a container handle along the line VII—VII in FIG. 1;

FIG. 8 is a view showing a partial transverse section of the cover and a cover handle along the line VIII—VIII in FIG. 1;

FIGS. 9a–9e are plan views showing a slider for adjusting the valve arrangement and a control plate arranged thereon, taken along the line IX—IX in FIG. 2, in the above-mentioned five different positions of the common operating member;

FIGS. 10a–10e are plan views of a ventillating slider and corresponding control plate, taken along the line X in FIG. 2, in the above-mentioned five different positions of the common operating member; and FIGS. 11a–11e are plan views of a locking slider and corresponding control plate, taken along the line XI in FIG. 2, in the above-mentioned five different positions of the common operating member.

DESCRIPTION OF PREFERRED EMBODIMENT

Figure 3:
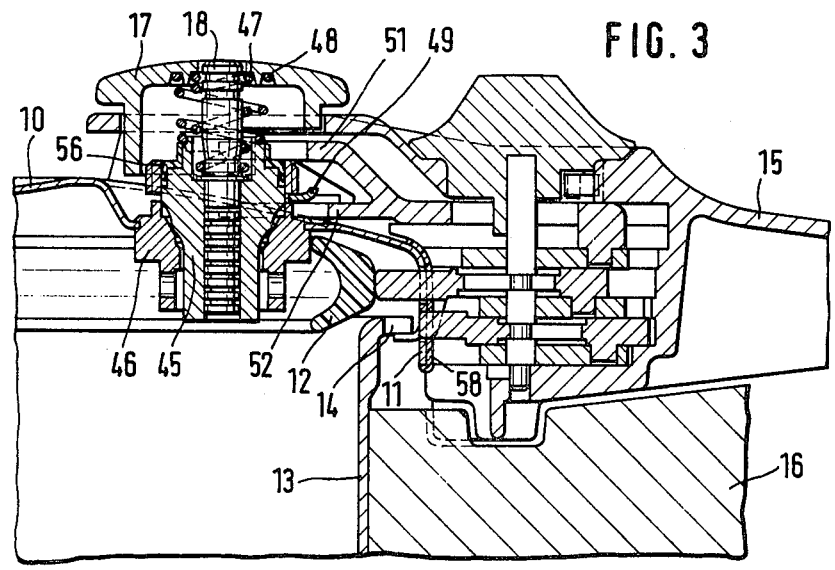
FIG. 3 is a view corresponding to the view shown in FIG. 2 but illustrating the operational position b "Opening" of the common operating member.
Figure 4:
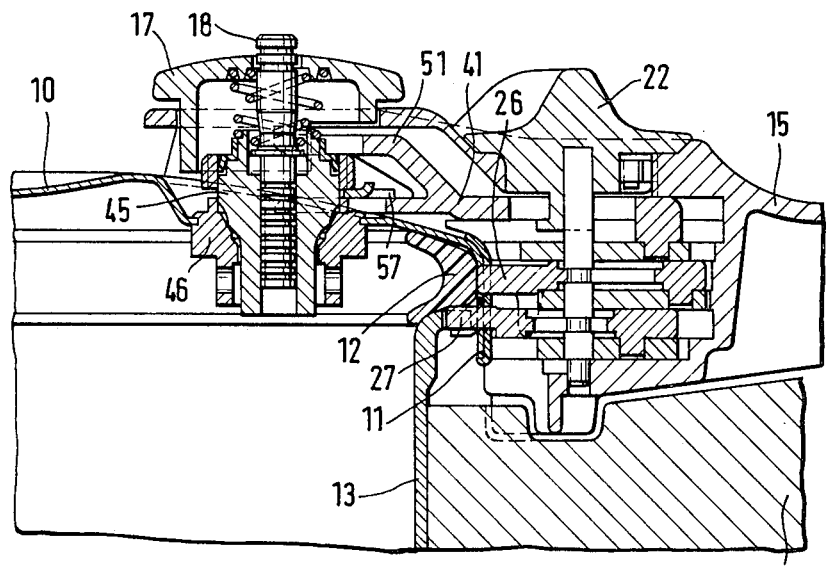
FIG. 4 is a view corresponding to the view shown in FIG. 2, but illustrating the operational position c "Cooking 1" of the common operating member.
Figure 5:
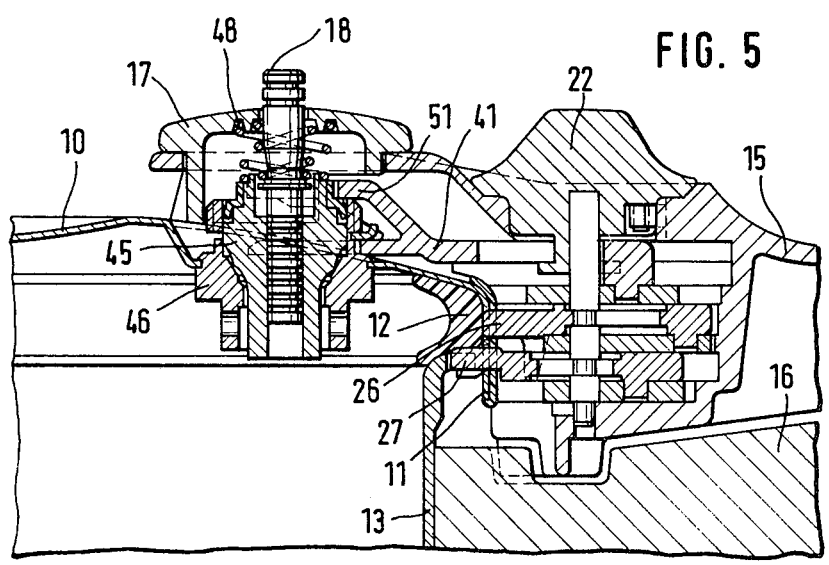
FIG. 5 is a view corresponding to the view shown in FIG. 2 but illustrating the position d "Cooking II" of the common operatig member.

The drawings show only those parts of a pressure cooker which is important for the present invention. FIGS. 1–5 show only one part of a cover 10 with a cover edge 11 and a sealing ring 12 inserted in the cover edge. FIGS. 3–5 show only an upper edge region of a cooking container 13 with an edge part 14 which is bent for a bayonet lock. The drawings also show a handle 15 which radially extends from the cover 10. FIGS. 3–5 also show only part of a radially extending container handle 16 which is in alignment with the cover handle 15 in closed position of the pressure cooker. A combined valve and safety device of the pressure cooker is completely arranged in the cover handle 15. As can be seen from FIG. 1, a valve part of the device has a circular insert 17 and a central pressure indicating rod 18. A steam outlet opening 19 is formed in an inner end portion of the handle 15. A partial section of the insert 17 of the valve part of the combined valve and safety device shows that the insert has two projections 20 at its opposite sides.

Figure 1:
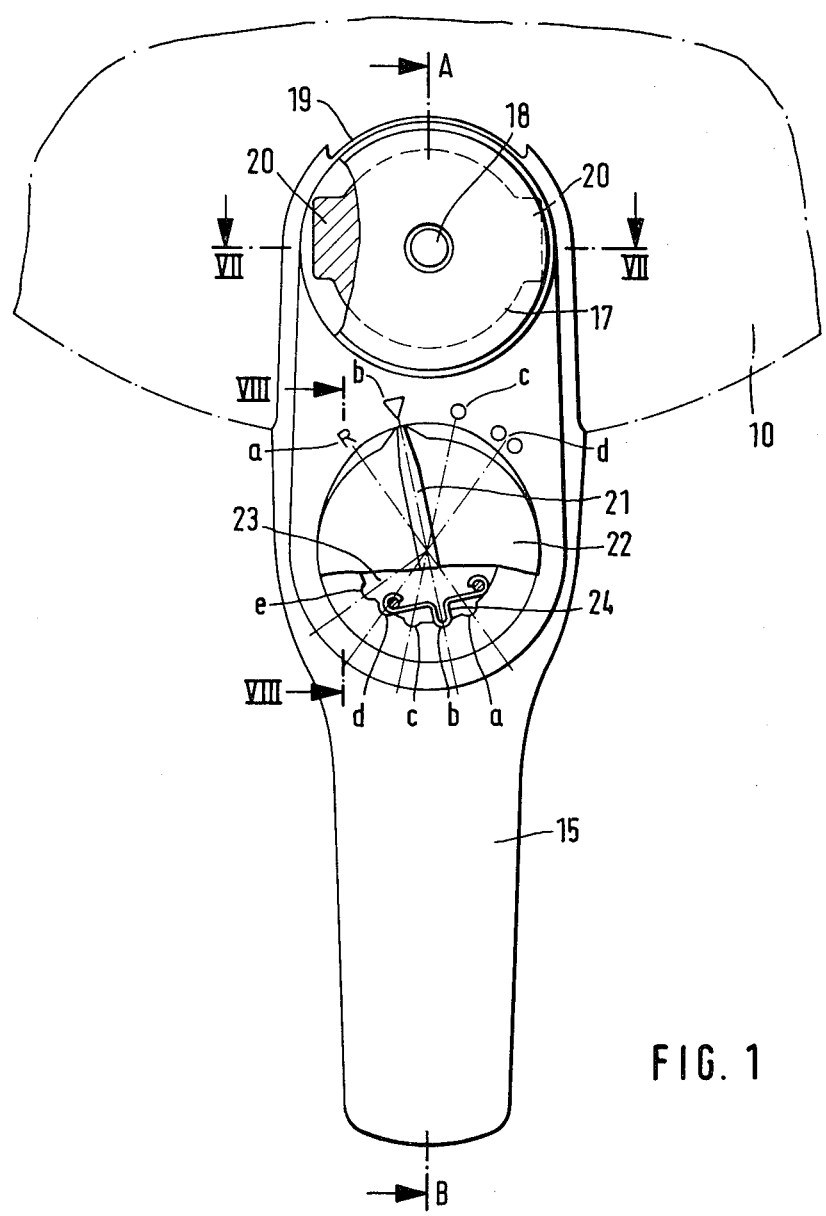
Figure 2:
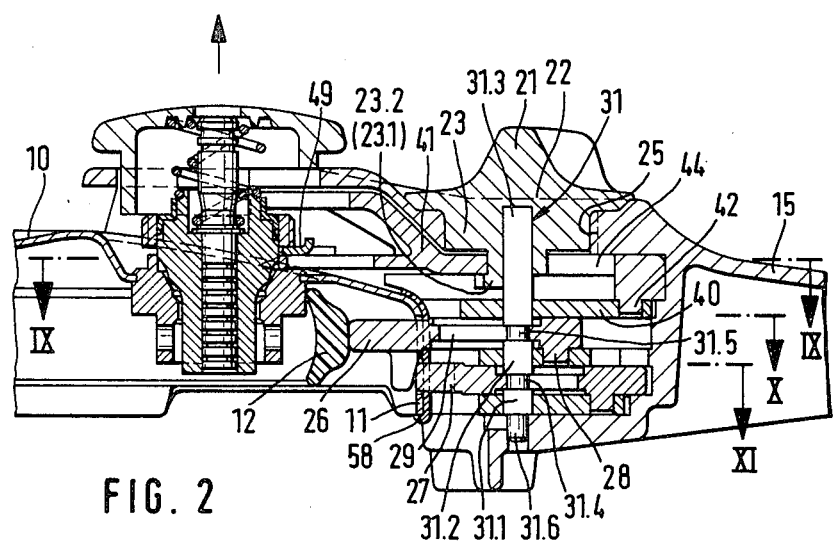
FIG. 2 is a view showing a central partial section through the cover along the line A–B in FIG. 1 in operational position a "Cleaning" of a common operating member.

As can be seen from FIG. 1, a rotary handle member 22 of a common operating member of the combined valve and safety device is provided. The handle member 22 has a web portion 21. The web portion 21 serves simultaneously as a position indicating element in cooperation with letters and symbols arranged on the upper face of the handle 15. Four operational positions are provided which are identified in the drawings by the letters a, b, c and d. As can be seen from the partial section of the rotary handle 22, the latter has a narrow bottom part 23 in which an arresting spring 24 is supported. The arresting spring 24 cooperates with arresting notches which are formed in a receiving opening 25 of the cover handle 15 for the bottom part 23 of the rotary handle 22. Thereby the common operating member is arrested in each individual operational position a–d. As can be seen in FIG. 1, the arresting notches are designated in correspondence with the respective operational positions by the latters a, b, c and d. The Figure shows also a fifth arresting notch e for a mounting position of the device, as will be explained hereinafter. In FIG. 1, the rotary handle 22 is located in its operational position b. The operational positions are the following:

a is the operational position "Cleaning";
b is the operational position "Opening";
c is the operational position "Cooking I";
d is the operational position "Cooking II"; and
e is the mounting position.

FIGS. 2–5 show the combined valve and safety arrangement in four different operational positions a–d. The construction of the safety device and the common adjusting or displacing arrangement for the combined valve and safety device will first be explained with reference to FIG. 2. Subsequently the construction of the valve device will be explained with reference to FIG. 3 with the utilization of the same reference numerals for the identical parts shown in these Figures.

The safety device or more particularly the safety part of the common valve and safety device includes a ventilating sliders 26 which extends through an opening in a sealing element 58 and in the cover edge 11 and acts for lifting of the sealing ring 12. The safety part of the device also includes a locking slider 27 which can extend as a lock through an opening in the sealing element 58 in the region of the bent edge part of the cooking container 13 and thereby prevents rotation of the cover 10 relative to the container 13. The ventilating slider 26 is shown in plan view in FIGS. 10a–10e. It has a downwardly extending front projection 26.1, is provided with a pin 28 at its rear end, and has an elongated opening 28 provided in its central part and extending in its longitudinal direction. The elongated opening 29 merges into a bigger hexagonal opening 30 at the inner end of the former.

The hexagonal opening 30 allows the insertion of the common operating member of the combined valve and safety device which is formed by an operating shaft 31 of a hexagonal cross-section. The operating shaft 31 is subdivided into three portions 31.1, 31.2 and 31.3 of a hexagonal cross-section which are connected by intermediate portions 31.4 or 31.5 of a smaller diameter and a circular cross-section. Furthermore, the control shaft 31 has a cylindrical supporting end portion 31.6. As can be seen from FIGS. 2–4, the cylindrical intermediate portion 31.5 of the operating shaft 31 is located in the region of fthe elongated opening 29 of the ventilating slider 26.

The control pin 28 of the ventilating slider 26 extend into a control groove 32 or a control slot which is formed in a control plate 33 arranged parallel to the ventilating slider 26. The control plate 23 has a hexagonal opening which corresponds to the hexagonal cross-section of the operating shaft 31. The hexagonal portions 31.2 of the operating shaft 31 extends in this hexagonal opening. Thereby, engaging connection between the control plate 33 and the operating shaft 31 is attained. The hexagonal opening is formed radially inwardly of the control groove 32 of the control plate 33.

The locking slider 27 shown in FIGS. 11a–11e in plan view is formed similarly to the ventilating slider 26 and provided in its outer end region with a control pin 34 and in this central region with an elongated opening 35. The elongated opening 35 merges at its outer end into a bigger hexagonal opening 36 which serves for insertion of the hexagonal operating shaft 31 in the mounting position shown in FIG. 6. The locking slider 27 is also provided with a control plate 37 which has a control groove 38 or a control slot. A control pin 34 of the locking slider 27 extends into the control groove for a slot of the control plate 37. A hexagonal through-going opening of the control plate 37 serves for engaging connection of the control plate 37 with the hexagonal portion 31.1 of the operating shaft 31. The cylindrical portion 31.4 located between the hexagonal portions 31.' and 31.2 of the operating shaft 31 is located at the height of the elongated opening 35 of the locking slider 27.

The common operating shaft 31 extends with its hexagonal end portion 31.3 into a hexagonal opening of the bottom part 23 of the rotary handle 22. Furthermore, it extends with its hexagonal end portion 31.3 in a respective hexagonal through-going opening of a third control plate 40 of a further slider 48. The latter is provided for control of the valve part of the combined valve and safety device. The control plate 40 and the slider 41 are shown in plan view in FIG. 9. The slider 41 is provided in its outer end region with a control pin 42 which extends in a control groove or a control slot 43 of the control plate 40. A wide elongated opening 44 is provided in the slider 41. The hexagonal portion 41.3 of the operating shaft 31 and a ring sector 23.1 provided with a safety collar 22.3 extend through the elongated opening 44, the bottom part 23 of the rotary handle 22 and in the ring sector 23.5.

The valve part of the combined valve and safety device has the above-mentioned cup-shaped insert 17 which is inserted in a matching circular recess of the cover handle 15. The pressure indicating bar 18 which is known for pressure cookers is arranged concentrically through the insert 17. The pressure indicating bar 18 extends with its upper end through an opening of the insert 17 and is supported in a coaxial valve body 45. The valve body 45 is provided with a sealing ring 56 and inserted in a valve seat member 46 so as to cooperate with the latter. The valve seat member 46 is mounted in an opening of the cover 10. Both the pressure indicating bar 12 and the valve body 45 are held under the prestress of a helical pressure spring 47 or 48, which respectively abuts by its inner end portion against the inner side of the insert 17.

The lateral projections 20 of the insert 17 of the valve part of the combined valve and safety device are formed with two identical step-like curved portions 39 shown in FIG. 7. The latter cooperate with an upper inner fork-shaped end portion 51 of the slider 41. As shown in FIG. 9a, the both step-like curved portions 39 are subdivided into a deeper initial section 39.1 and a higher end section 39.2 which merge into one another via an inclined transitional section 32.3. With the aid of the step-like curved portions 39, the inserting position of the insert 17 by means of the slider 41 can be adjusted, and thereby the prestress of both springs 47 and 48 of the valve part of the device can also be adjusted.

A lower inner end portion 52 of the slider 41 serves for exact guidance of the slider. It slides under a guide plate 49 which can be seen from FIGS. 2–5 and FIG. 7. The guide plate 49 is mounted in the valve seat member 46 anchored in an opening of the cover, and simultaneously extends in grooves 57 arranged at both sides of the cover handle for fixing the cover handle 15.

FIGS. 7 and 8 also show the mounting of the cover handle 15 on the cover edge 11 by two screws 54 and a gripping plate 63 or counternut inserted in a slot 55 of the cover handle 15. The mounting screws 54 are accessible only from the inner side of the cover and arranged at a location which is normally covered by the sealing ring 12. The through-going openings for the locking slider 27 and the ventilating slider 28 are located in the cover edge 11 between the mounting screws 54.

The FIGS. 2, 9a, 10a and 11a show the device in the operational position a ("Cleaning"). The slider 41 in this position is displaced outwardly so that its upper inner end portion 51 is withdrawn from the region of the step-like curved sections 39, and the lower inner end portion 52 engages under the guide plate 49. Thereby, the insert 17 with the pressure springs 47 and 48, and also the valve body 45 with the pressure indicating bar 17 can be removed out of the cover handle 15 or the valve seat member 46 for cleaning purposes.

The operational position a can be provided only with removed cover 10. This is guaranteed by the ventilating slider 26 which in this position corresponding to FIG. 10a is displaced radially inwardly so that it with its projection 26.1 extends to the region of the edge of the cooking container 13. It can assume this position only with the removed cover 10. In the operational position a, the cover 10 also cannot be fitted on the cooking container 13 because of the inwardly displaced ventilating slider 26. In the operational position a, the locking slider 27 is displaced radially outwardly into its released position.

FIGS. 1, 3, 9b, 10b and 11b show the device in the operational position b ("Opening"). This operational position is attained by partial rotation of the operating shaft 31 on the rotary handle 22 in clockwise direction from the arresting position a into the arresting position b (FIG. 1). Thereby respective turning of the control plate 33, 37 and 40 with their control grooves 32, 38, and 43 is attained. Thereby the slider 41 assumes the position shown in FIG. 9b in which its upper inner end portion 51 overlaps the initial section 39.1 of the step-like curved portions 39. Thereby, the insert 17 is reliably retained in the recess of the cover handle 15 in its first position. The ventilating slider 26 is displaced as shown in FIG. 10b to a position in which it with its projection 26.1 no longer extends into the region of the container edge, but, as shown in the operational position a in FIG. 1, holds the sealing ring 12 of the cover 10 lifted from the cover ring 11 so as to provide for forced ventilation of the interior of the cooking container. The locking slider 27 remains in FIG. 11b in its released position, so that in the operational position b the cover 10 can be fitted onto the cooking container 13 or removed from the latter.

FIGS. 4, 9c, 10c and 11c show the device in the operational position c ("Cooking I"). In this position, the slider 41 as shown in FIG. 9c remains in its position assumed in the operational position b. The ventilating slider is, however, pulled back to the cover edge 11 (FIG. 10c), so that the sealing ring 12 tightly abuts against the cover edge 11. The locking slider 27 in correspondence with FIG. 11c is displaced radially inwardly, so tht it extends near the edge projection 14 of the container 13 and thereby makes impossible rotation of the cover 10 on the cooking container 13 and opening of the latter.

FIGS. 5, 9d, 10d and 11d show the device in the operational position d ("Cooking II"). In this operational position, the ventilating slider 26 and the locking slider 27 are in the same location in which they were in the operational position c, as can be seen from FIGS. 10d and 11d. In accordance with FIG. 9d, the slider 41 is, however, displaced radially further inwardly, so that its upper inner end portion 51 slides over the end section 39.2 of the step-like curved portions 39 of the insert 17 of the valve part and the insert 17 is pulled deeper into the opening of the cover handle. This results in compression of the pressure spring 48 acting upon the valve body 45. The valve body 45 is first, because of high inner pressure of the cooking container, lifted from the valve seat member 46 as in the operational position c "Cooking I".

FIGS. 6, 9e, 10e and 11e show the device in the mounting position e. This position of the device can be attained only when the cover handle 15 is not mounted on the cover 10. Prior to the mounting, the displaceable sliders 26, 27 and 41 and their control plates 33, 37 and 40 are lined up on the operating shaft 31. The arrangement is inserted in FIG. 6 from the left to right into the body of the cover handle 15. One more longitudinal displacement of the operating shaft 31 takes place, and after the insertion the rotary handle 22 is so fitted that it engages in the arresting notch e (FIG. 1). After this, the rotary handle is turned in counterclockwise direction to the next operational position d, and the operating shaft 31 extends from the expanded hexagonal regions 30 and 36 of the elongated openings 29 and 33 of the ventilating slider 26 and the locking slider 27. Then, the cover handle 15 is mounted by the mounting screws 54 and the clamping plate 63 on the cover 10 as shown in FIGS. 7 and 8.

It will be understood that each of the elements described above, or two or more together, may also find a useful application in other types of constructions differing from the types described above.

While the invention has been illustrated and described as embodied in a pressure cooker, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims:

1. A pressure cooker, comprising a cooking container having an axis; a cover retainable on said container by a bayonet lock and having a sealing ring; a radially extending handle on said cover; and a combined valve and safety device arranged in said handle and having valve elements, safety elements and one common operating element interdependently adjusting and actuating said valve and safety elements, said valve elements of said device
including a pressure limiting valve simultaneously forming a safety valve and one slider arranged to adjust said pressure limiting valve, said safety elements of said device including two further sliders one of which is formed as a ventilating slider and arranged for lifting of said sealing ring of said cover, whereas the other of said sliders is formed as a locking slider and arranged for mechanical locking of said cover on said container, said common operating element being formed as an operating shaft provided with an outer rotary handle member, and said device including at least one control plate engaged with said operating shaft and having at least one control groove, and a control pin connected with one of said sliders and engaging in said control groove.

2. A pressure cooker as defined in claim 1, wherein said device includes one such control plate for each of said sliders, each of said control plates having a polygonal opening, said operating shaft having a plurality of polyhedral axial portion each dimensioned in correspondence with and extending through a respective one of said polygonal openings of said control plates.

3. A pressure cooker as defined in claim 2, wherein the polygonal opening of each of said control plates communicates with and is located radially inwardly of the control groove of the same control plate.

4. A pressure cooker as defined in claim 3, wherein each slider has a longitudinal opening through which said operating shaft extends.

5. A pressure cooker as defined in claim 4, wherein said operating shaft has a further plurality of axial portions each located between and connecting said polyhedral axial portion extending through said polygonal openings of said control plates, said further axial portions being cylindrical and coaxial with said polyhedral axial portions, having a smaller diameter than the latter, and each being located in the region of a respective one of said further sliders.

6. A pressure cooker as defined in claim 5, wherein the longitudinal opening of at least one of said further sliders has an end section of a polygonal cross-section which is defined by an edge having a profile corresponding to that of a respective one of said polyhedral axial portions of said operating shaft.

7. A pressure cooker as defined in claim 1, wherein said cover has an axially outer portion provided with a receiving opening, and an axially inner portion provided with a polygonal opening, said outer rotary handle member having a bottom part inserted in said receiving opening of said axially outer portion of said cover.

8. A pressure cooker as defined in claim 7, wherein said outer rotary handle member has an axial opening, said operating shaft having a first axial end portion which is cylindrical and supported on said axial opening of said outer rotary handle member and a second axial end portion which is polyhedral and extending into said polygonal opening of said axially inner portion of said cover.

9. A pressure cooker as defined in claim 7, and further comprising arresting means including a first arresting formation provided on said bottom part of said rotary handle member and a second arresting formation provided on said cover and engageable with said first arresting formation.

10. A pressure cooker as defined in claim 9, wherein said first arresting formation includes a plurality of arresting notches provided in said bottom part of said rotary handle member, whereas said second arresting formation is an arresting spring provided in said cover and cooperating with said notches.

11. A pressure cooker as defined in claim 9, wherein said first arresting formation includes a plurality of arresting notches provided in a wall of said receiving opening of said axially outer portion of said cover, whereas said second arresting formation is an arresting spring provided in said bottom part of said rotary handle member and cooperating with said notches.

12. A pressure cooker as defined in claim 8, wherein said one slider of said valve elements of said device has a longitudinal opening with an edge, said bottom part of said rotary handle member having an annular sector section which is concentrical with said axial opening of said bottom part, extends through said longitudinal opening of said slider and has a safety collar interengaging with said edge of said longitudinal opening.

13. A pressure cooker as defined in claim 1, wherein said valve elements include at least one valve spring and at least one insert member formed as an abutment for said spring and having a step-like curved portion, said one slider of said valve elements having a radially inner end portion cooperating with said step-like curved portion of said insert member.

14. A pressure cooker as defined in claim 13, wherein said one slider of said valve elements has a further radially inner end portion which is axially spaced from said first-mentioned radially inner end portion, said cover having a guide part with which said further inner end portion of said one slider cooperates.

15. A pressure cooker as defined in claim 14, wherein said valve elements include a valve seat member mounted in said cover and a valve body arranged so that said valve spring is prestressed between said insert member and said valve member, said valve body being provided with a sealing ring and cooperating with said valve seat member at said cover.

* * * * *